US008838424B2

(12) United States Patent  
Brule et al.

(10) Patent No.: US 8,838,424 B2  
(45) Date of Patent: Sep. 16, 2014

(54) METHOD AND A DEVICE FOR SYNTHESIZING AN ELECTRICAL AND ELECTRONIC ARCHITECTURE

(75) Inventors: Nicolas Brule, Marseilles (FR); Jean-Marc Bathellier, Velaux (FR)

(73) Assignee: Airbus Helicopters, Marignane Cedex (FR)

( * ) Notice: Subject to any disclaimer, the term of this patent is extended or adjusted under 35 U.S.C. 154(b) by 566 days.

(21) Appl. No.: 13/179,877

(22) Filed: Jul. 11, 2011

(65) Prior Publication Data

US 2012/0022835 A1 Jan. 26, 2012

(30) Foreign Application Priority Data

Jul. 23, 2010 (FR) ...................................... 10 03102

(51) Int. Cl.
*G06F 17/50* (2006.01)
*G06G 7/48* (2006.01)

(52) U.S. Cl.
CPC ........ *G06F 17/5095* (2013.01); *G06F 2217/36* (2013.01)
USPC ............................. 703/8; 703/1; 703/6; 703/7

(58) Field of Classification Search
None
See application file for complete search history.

(56) References Cited

U.S. PATENT DOCUMENTS

| 6,457,165 | B1 * | 9/2002 | Ishikawa et al. ............... 716/126 |
| 6,879,941 | B1 | 4/2005 | Ehrenberg et al. |
| 6,990,649 | B2 * | 1/2006 | Claras ........................... 716/130 |
| 7,082,590 | B2 * | 7/2006 | Kragh et al. ................... 716/129 |

| 2004/0098698 | A1 | 5/2004 | Teig |
| 2007/0141899 | A1 | 6/2007 | Saini |
| 2009/0063035 | A1 | 3/2009 | Mandel |

FOREIGN PATENT DOCUMENTS

| EP | 0696775 A1 | 2/1996 |
| EP | 2278504 A1 | 1/2011 |
| FR | 2846117 A1 | 4/2004 |
| WO | 9831158 A1 | 7/1998 |
| WO | 0223688 A2 | 3/2002 |

OTHER PUBLICATIONS

A New Distributed Avionics System Based on the Canbus and Homogeneous Nodes. Jose M. Giron-Sierra et al. Industrial Technology. vol. 2, Dec. 8, 2004 pp. 892-897, XP01022158 DOI: DOI: 10.1109-ICIT.2004.1490193. ISBN: 978-0-7803-8662-4.

Search Report and Written Opinion; Application No. FR 1003102; dated Feb. 17, 2011.

* cited by examiner

*Primary Examiner* — Omar Fernandez Rivas  
*Assistant Examiner* — Nithya J Moll  
(74) *Attorney, Agent, or Firm* — Brooks Kushman P.C.

(57) ABSTRACT

A device for synthesizing an electrical and electronic architecture (100) of a complete product (1) that is to satisfy given requirements. The device has first means (10) for representing said product to subdivide the product into a plurality of zones and to reserve a network of pathways allocated to said wired connections, second means (20) for drawing up a list of equipment (60) to be installed in said product (1), said list comprising, for each piece of equipment (60), the zones in which the equipment may be arranged, third means (500) for drawing up at least one functional scheme, including information relating to the wired connections (80) leaving the equipment (60) and to their destinations, fourth means (30) for placing each piece of equipment (60) in a zone (14) and for routing and fifth means (40) for evaluating said architecture (100) to determine whether it is compatible with said requirements, and to store the architecture and the evaluation in memory.

18 Claims, 2 Drawing Sheets

METHOD AND A DEVICE FOR SYNTHESIZING AN ELECTRICAL AND ELECTRONIC ARCHITECTURE

CROSS REFERENCE TO RELATED APPLICATIONS

This application claims the benefit of FR 10 03102 filed on Jul. 23, 2010, the disclosure of which is incorporated in its entirety by reference herein.

BACKGROUND OF THE INVENTION (1) Field of the Invention

The present invention relates to a method and a device for synthesizing an electrical and electronic architecture.

More particularly, the invention relates to aircraft, and in particular rotary wing aircraft.

(2) Description of Related Art

In order to make a product that includes electrical and electronic equipment connected together by wired connections, it is necessary to devise the electrical architecture comprising said pieces of equipment and the connections.

It should be observed that the term "equipment" is used to cover any component that sends or receives an electric or electronic signal, i.e. equally well a sensor, a computer, or a battery, for example.

Similarly, the term "wired connections" covers any connection means that serve to pass energy or information, such as an electrical wired connection, or an optical fiber connection, for example.

The drawing up of the electrical and electronic architecture of an aircraft is an important step in the design of the aircraft. The electrical and electronic architecture of a product, and in particular of an aircraft, has a large amount of equipment and thus a large number of wired connections between that equipment. Under such circumstances, it can be understood that each specific architecture stems not only from the various possible positions for each equipment, but also from the interaction between each piece of equipment, while taking account of integration constraints such as safety constraints, environmental constraints, or indeed maintenance constraints, for example.

This complexity explains why it is important to achieve a robust and exhaustive prior definition of the architecture so that the finished product has an architecture that is optimized as a function of predetermined requirements, including, for example:

the weight of the components of the harnesses;
the centers of gravity of the harnesses;
the time required to assemble and to maintain harnesses; and
costs which generally decrease with weight and operating time.

Consequently, during the stage of predefining the aircraft, it is difficult to evaluate the characteristics of the future electrical architecture. When designing an aircraft, a manufacturer advantageously investigates various alternative electrical architectures and selects one of them as a function of given requirements. For the selected architecture, it is also advantageous to possess the characteristics of said architecture such as center of gravity, for example, since that has a direct incidence on the operation of the aircraft, or on weight targets to be satisfied for the equipment and the wired connections.

In one technique, an architecture for a future product is extrapolated on the basis of the architecture of an existing product. Although advantageous, that technique does not make it possible to obtain alternative architectures, and thus potentially obtain a final architecture that is optimized.

It should be observed that the technological background includes document US 2007/141899, which makes use of a network made up of equipment of unvarying positions that are interconnected by unvarying pathways along which wired connections pass.

Document FR 2 846 117 seeks to synthesize an architecture of a product part by positioning routing points in a zone.

By way of example, the technological background also includes the following documents: EP 0 696 775; WO 98/31158, US 2004/0098698; U.S. Pat. No. 6,879,941; and US 2009/0063035.

SUMMARY OF THE INVENTION

A particular object of the present invention is to provide a method and a device enabling an electrical and electronic architecture of a product to be synthesized and evaluated accurately, and more particularly an electrical architecture for an aircraft.

According to the invention, a method of synthesizing an electrical and electronic architecture of a complete product that needs to satisfy given requirements, said architecture including wired connections connecting together some pieces of equipment of the product, is particularly remarkable in that it comprises the following steps:

defining zones of said product suitable for receiving said equipment;
defining a network of pathways within said product for receiving said wired connections, the pathway network connecting any one zone to all the other zones;
drawing up a list of equipment for installing in said product and the zones in which each equipment can be arranged;
drawing up at least one functional scheme comprising, for at least one equipment, information relating to the wired connections leaving the equipment and to their destinations;
positioning each equipment in a zone;
performing routing by connecting each equipment in compliance with said information by means of wired connections following said pathway network; and
evaluating said architecture in order to determine whether it is compatible with said requirements, and storing the architecture and the evaluation in memory.

It should be observed that the term "functional scheme" designates a medium providing for at least one equipment information relating to the wired connections leaving that equipment and relating to their destinations, such as a schematic diagram or indeed a database, for example. The set of functional schemes used serves to describe all of the wired connections of the architecture. A single functional scheme could be used for all of the equipment, which scheme may be included in said list.

Thus, in the invention, a network of pathways is defined for interconnecting unchanging zones, instead of using routing points or a network of pathways interconnecting unchanging equipment. This network of pathways is simplified insofar as it consists solely in space that is reserved for the wired connections of the architecture. In addition, not all of the equipment is represented; only the zones that are to receive the pieces of equipment are represented.

While the routing is being established, each equipment is connected by one or more wired connections to one or more pieces of equipment in compliance with the information contained in the functional scheme, with each wired connection between two pieces of equipment using the pathway network by following segments that enable length to be minimized.

This results in an architecture that is optimized in terms of weight, in particular, which constitutes a technical advantage of particular significance when the weight of a product is a major concern, as applies with a vehicle and in particular an aircraft, for example.

Furthermore, the method makes it possible to extract a technical definition that is usable by all of the trades contributing to manufacturing the product, for example individuals defining the structure of the product taking account of the dimensions of the connectors of the architecture running through the structure.

For a configuration of equipment positions, the method makes it easy to create a simplified architecture and then to evaluate the simplified architecture in compliance with predefined requirements. The electrical and electronic network of the product is then manufactured with the help of the architecture as stored in memory and evaluated.

The method may include one or more of the following characteristics.

For example, after storing the architecture and the evaluation, either the pathway network, or the location of at least one equipment, or both the pathway network and the location of at least one equipment is/are modified in order to obtain an alternative architecture associated with a new evaluation. It can be understood that in order to optimize the number of iterations, it is possible to modify a single parameter at a time or else the pathway network, or else the location of at least one equipment.

For example by using a heuristic algorithm, it becomes possible to construct and evaluate a set of all potential architectures after said list has been constructed in order to manufacture the electrical and electronic network on the basis of the architecture that presents the best compromise in satisfying the given requirements.

Furthermore, for the product extending from a front end to a rear end, such as a vehicle of the aircraft type extending from its nose to its tail for example, in order to define a pathway network, the following steps are performed:
  defining at least one primary pathway going from said front end to said rear end;
  defining a plurality of secondary pathways, each zone being connected to each primary pathway via a respective secondary pathway, a node being located at each intersection between a primary pathway and a secondary pathway, and a node being located at each intersection between a secondary pathway and a zone.

The primary pathway can be thought of as a highway, and each zone can be thought of as a city, being connected to the highway by a secondary road, i.e. a secondary pathway.

In another aspect, said pathway network has a plurality of pathways and each pathway includes a routing limitation, the functional scheme may include for at least one given wired connection a routing constraint corresponding to a routing limitation of at least one pathway.

For example, it is possible to associate a first primary pathway with a routing limitation referred to as a "right" route, and a second primary pathway with a routing limitation referred to as a "left" route. Under such circumstances, by associating the "go right" routing constraint with a wired connection, it is ensured that that wired connection passes via the first primary pathway.

A routing limitation may also be of a technical nature as opposed to a positioning nature, for example it may include a limitation of the "EMI pathway" type for a pathway that is sheltered from electromagnetic interference, for example.

Furthermore, each equipment is positioned at the center of gravity of a zone. Surprisingly, it is found that this characteristic makes it possible quite significantly to simplify the method without significantly degrading the results of evaluating the architecture.

A simplified architecture is thus defined that can be evaluated overall for the complete product, e.g. during the stage of predefining an aircraft. If the architecture is satisfactory, the pieces of equipment are positioned more accurately within their respective zones during a stage of detailed design of the aircraft, e.g., but not necessarily, by applying the teaching of document FR 2 846 117.

The electrical and electronic network of the product is built up in this way.

In another aspect, if two pieces of equipment in a given zone need to be connected together by a wired connection, the zone being connected to the pathway networks via at least one node, then during routing the wired connection connecting together two pieces of equipment in a given zone is caused to pass via a node of said given zone.

Furthermore, said list of equipment includes primary equipment and secondary equipment dedicated to enabling said primary pieces of equipment to operate properly, and said secondary equipment comprises at least one member selected from one of the following categories: electrical grounding means; electrical power supply distribution means; lighting distribution means; interconnection means; and data concentration means.

Thus, the list of pieces of equipment comprises firstly primary equipment and secondly secondary equipment constituting utilities for the purpose of optimizing the operation of the primary pieces of equipment.

Data concentrator means comprise equipment that receives information from source-constituting primary equipment such as sensors, for example, and serving to dispatch the information to destination primary equipment. Instead of connecting a sensor to a plurality of given primary equipment, the sensor is connected to a secondary equipment that communicates with said destination primary equipment.

Similarly, lighting distribution means comprise means enabling the lighting of light-emitting equipment that is present in the cabin and/or the cockpit of the aircraft to be made uniform.

In addition, interconnection means are intermediate means enabling a given primary equipment or a secondary equipment to be connected to a plurality primary and/or secondary pieces of equipment.

In addition, for the functional scheme indicating that a given primary equipment should be electrically connected to a secondary equipment of a given category, during routing, it is possible to use a wired connection to connect the primary equipment to the secondary equipment of the given category that is the nearest to the given primary equipment, or that optimally satisfies the predefined requirements.

Furthermore, in order to evaluate an architecture, it is possible to determine at least one of the elements in the following selection:
  the weight value of the architecture;
  the center of gravity of the architecture;
  for the pathway network having at least one primary pathway, each zone being connected to each primary pathway via a respective secondary pathway, a node being located at each intersection between a primary pathway and a secondary pathway, and a node being located at each intersection between a secondary pathway and a zone, the number of wires passing along a segment interconnecting two nodes, and the diameter of an associated strand including said wires;

for said pathway network having at least one interrupter socket, for example between two sections of the product manufactured independently from each other, the number of wires connected to said interrupter socket; and for said list of equipment including primary equipment and secondary equipment dedicated to ensuring proper operation of said primary pieces of equipment, the number of wires connected to each secondary equipment.

It should be observed that in order to determine the mass or the center of gravity, it is possible to determine the thickness of the wires of each wired connection, which thickness varies as a function of the length of the wired connection, for example.

Optionally, for said pathway network having at least one interrupter socket, for example between two sections of the product manufactured independently from each other, if the number of wires connected to said interrupter socket for a given architecture is less than a first threshold, e.g. ten, then while constructing an alternative architecture said interrupter socket is omitted.

This avoids using interrupter sockets that are underused.

Likewise, for said list of equipment comprising primary equipment and secondary equipment dedicated to proper operation of said primary equipment, if the number of wires connected to a secondary equipment for a given architecture is less than a second threshold, then during construction of an alternative architecture said secondary equipment is omitted.

Furthermore, for said pathway network including a plurality of segments, if the number of wires passing along a segment is less than a third threshold, then during construction of an alternative architecture, said segment is omitted.

In addition to a method, the invention also provides a device suitable for implementing the method.

According to the invention, a device for synthesizing an electrical and electronic architecture of a complete product that is to satisfy given requirements, the architecture including wired connections connecting together electrical and electronic equipment of the product, is remarkable in that it comprises:

first means for representing said product for subdividing the product into a plurality of zones and for reserving a network of pathways allocated to said wired connections;

second means for drawing up a list of equipment to be installed in said product, said list comprising, for each equipment, the zones in which equipment can be arranged;

third means for drawing up at least one functional scheme comprising, for at least one equipment, information relating to the wired connections leaving the equipment and to their destinations;

fourth means for positioning each equipment in a zone and for establishing routing connecting each equipment in accordance with said information by means of wired connections following said pathway network; and fifth means for evaluating said architecture in order to determine whether it is compatible with said requirements, and for storing said architecture and evaluation in memory.

BRIEF DESCRIPTION OF THE DRAWINGS

The invention and its advantages appear in greater detail from the following description of embodiments given by way of illustration and with reference to the accompanying figures, in which.

Elements present in more than one of the figures are given the same references in each of them.

DETAILED DESCRIPTION OF THE PREFERRED EMBODIMENTS

Figure 1:
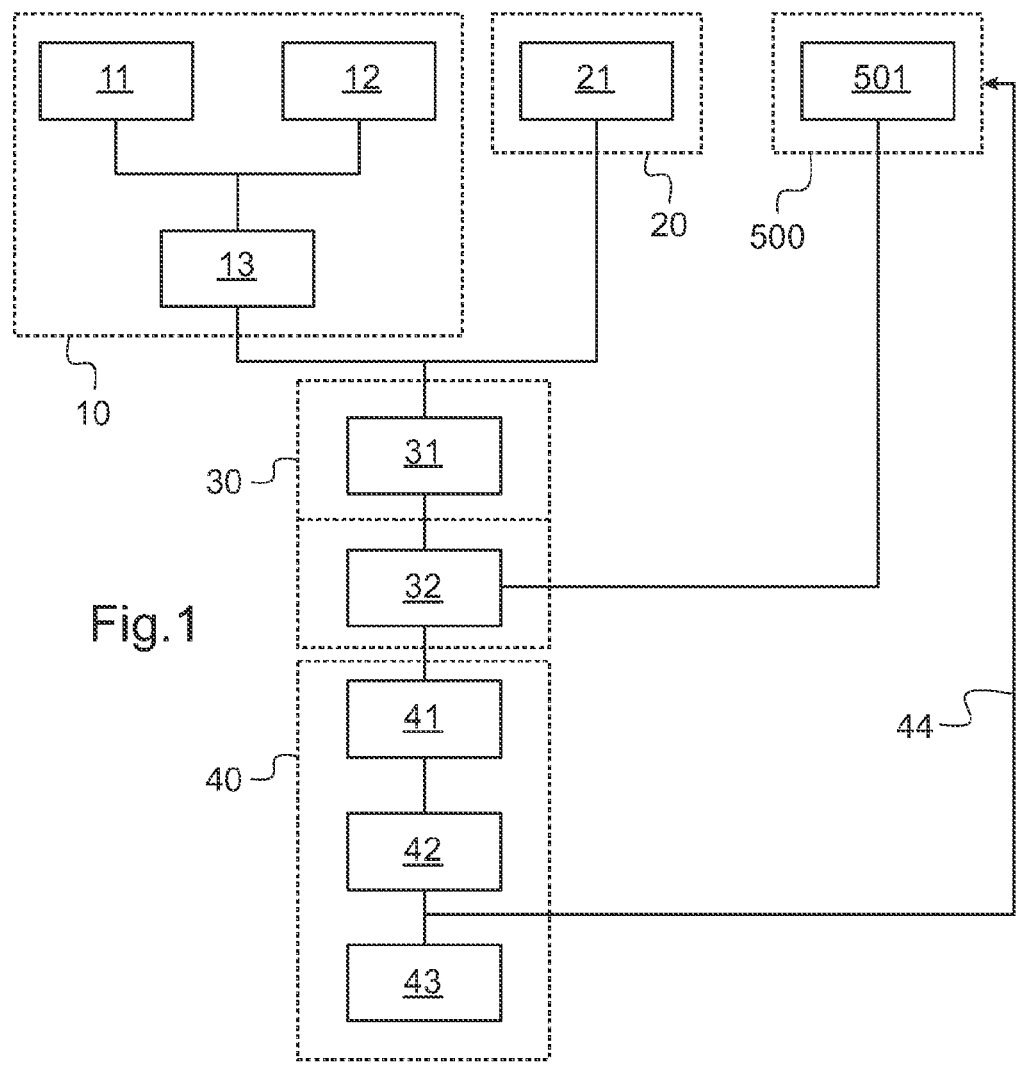
FIG. 1 is a block diagram explaining the method of the invention and the associated device.

FIG. 1 is a diagram explaining the method of the invention and the device implementing the method.

The method serves to synthesize an electrical and electronic architecture for a product taken as a whole, the architecture also being evaluated to verify that it satisfies given requirements, for example.

In a first preparatory step 11, first representation means 10 subdivide the product into a plurality of zones.

Figure 2:
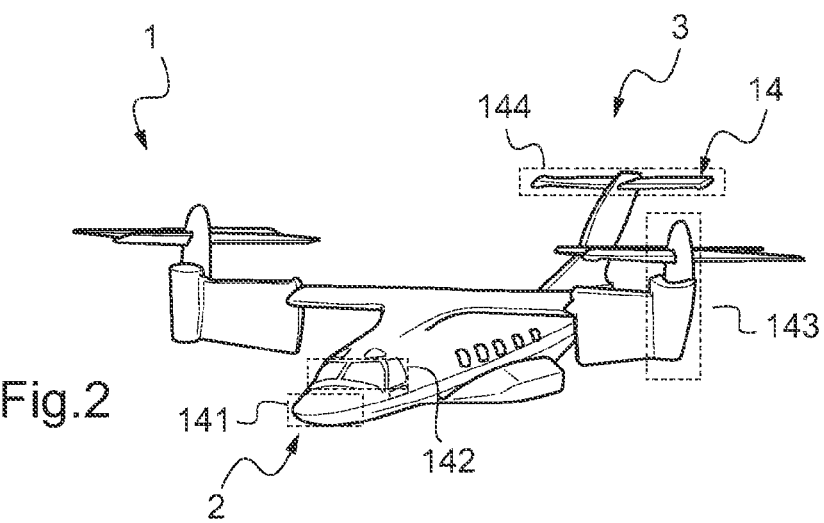
FIG. 2 is a view explaining how the product is subdivided into zones.

With reference to FIG. 2, the product 1 is possibly an aircraft extending from a front end 2 to a rear end 3.

By way of example, the first means comprise a computer unit implementing a computer-assisted design tool suitable for representing the product in three-dimensional space.

An operator moves the first means to define zones 14 of the product that might receive items of equipment, e.g. a nose zone 141, a zone associated with the aircraft cabin 142, a zone for the left propulsion assembly 143, a zone for the horizontal stabilizer 144, etc. . . . .

In order to define the zones, an operator takes physical barriers of the product 1 into consideration, such as walls, with a zone being located between two walls, for example.

Furthermore, the operator may segregate the product into two portions, for example. With an aircraft, it is common practice to ensure equipment redundancy for safety reasons. Under such circumstances, each space that extends between two walls may be separated into a left zone and a right zone, for example.

In addition, two zones may be separated for environmental reasons. In an aircraft, so-called "fire" zones are defined, for example, in which the risk of fire is relatively high, such as engine zones or a baggage hold.

Finally, zone creation may take account of manufacturing constraints. It is not unusual for a product to be manufactured in modular manner by distinct manufacturing entities.

Thus, the product may comprise two modules, for example, that need to be assembled together at an advanced stage of product manufacture. It will be understood that subdividing the product into zones takes this constraint into account so that no zone is common to two modules.

As explained, an operator uses the first means 10 to define the zone. Nevertheless, it should be understood that this step may be automated using a suitable program incorporating selected subdivision rules.

As shown in FIG. 1, during a second preparatory step 12, the first means 10 serve to define a network of pathways within the product. This network of pathways reserves space that is dedicated to wired connections of the electrical and electronic architecture of the product.

Figure 3:
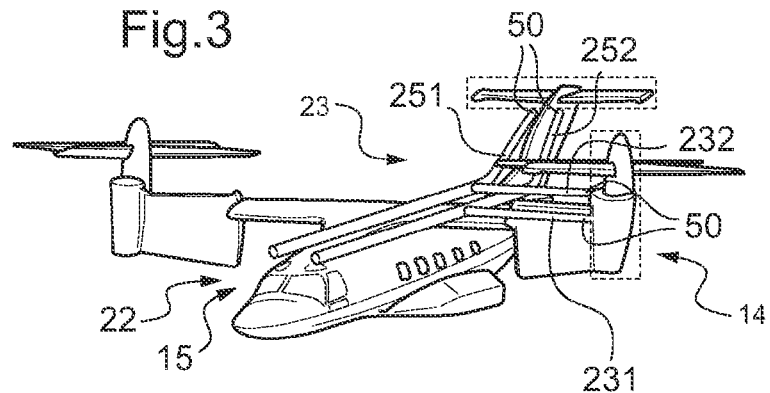
FIG. 3 is a diagram showing a network of pathways connecting the zones together.

With reference to FIG. 3, the network of pathways 15 may comprise at least one primary pathway 22 going from the front end 2 of the product 1 towards the rear end 3.

For safety reasons, the primary pathway may be made redundant by providing at least two primary pathways 221 and 222, possibly in the top portion of the product.

Furthermore, the network of pathways 15 possesses one secondary pathway 23 per zone 14 and per primary pathway. Thus, each zone 14 is connected to each primary pathway 221, 222 via a respective secondary pathway 231, 232; 251, 252.

Each intersection between the primary pathway and a secondary pathway 23 and between a secondary pathway 23 and a zone represents a node 50.

These primary and secondary pathways 22 and 23 thus represent real or imaginary pipes in which the wired connections between the equipment extend. These primary and secondary pathways 22 and 23 may be defined by an operator using the first means 10, or they may be defined automatically by said first means 10 in application of pre-established rules.

Figure 4:
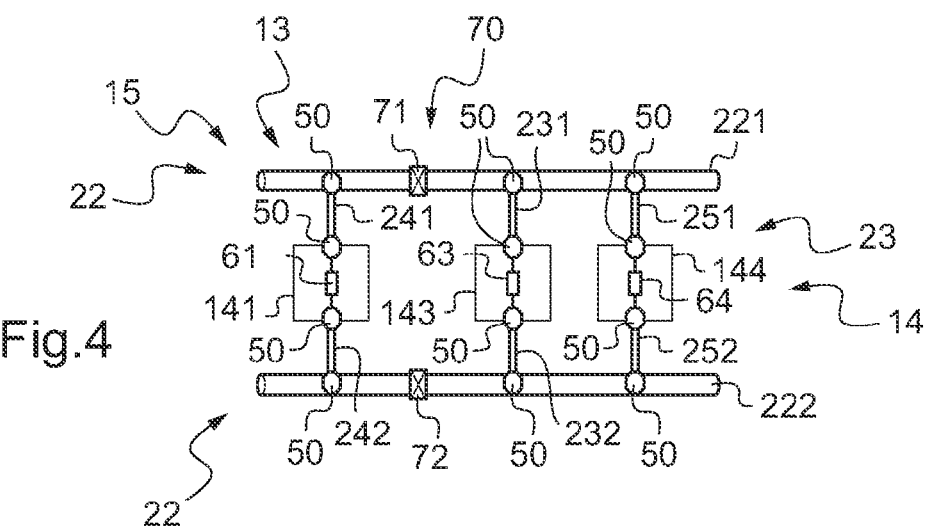
FIG. 4 is a diagram showing a network of pathways interconnecting the zones and laid out flat.

As shown in FIG. 4, a skeleton 13 of the overall electrical and electronic architecture of the product is thus prepared in particular with the help of the first means 10 by defining zones 14 for receiving equipment and a network of pathways 15 connecting each zone 14 to all of the other zones.

Under such circumstances, during a third preparatory step 21 implemented using second means 20, a list is drawn up of the equipment 60. The second means may comprise input means together with a memory containing a database, for example, with an operator using the input means to feed data into the database.

Furthermore, during a fourth preparatory step 501 implemented using third means 500, at least one functional scheme is drawn up comprising, for at least one given equipment, information about the wired connections that need to go from said given equipment in order to reach other equipment and zones that may receive the given equipment.

For example, for a first equipment:
the functional scheme indicates that the first equipment needs to be connected to a second equipment via a wired connection having two wires, to a third equipment via a wired connection having one wire, and to the electrical ground of the product; and
the list of equipment indicates that the first equipment may be installed in a first zone and in a third zone.

The wires may be electric wires or optical fibers, for example.

In a placing step 31, once the skeleton 13 has been obtained and while making use of the list of equipment, each equipment is arranged in a zone while using fourth means, a processor programmed for this purpose or a processor making use of a program suitable for performing the required function, for example.

FIG. 4 shows a skeleton 13 provided by way of illustration with two main pathways 221 and 222, and with three zones 141, 143, and 144, each of the zones 141, 143, and 144 being connected to the two main pathways 221 and 222 via two secondary pathways, respectively 241 & 242, 231 & 232, and 251 & 252. For ease of understanding, the skeleton 13 is shown in two dimensions in FIG. 4.

It can be seen that each main pathway includes an electrical interrupter socket 70, a first interrupter socket 71 being arranged in the first main pathway 221 and a second interrupter socket 72 being arranged in the second main pathway 222. Interrupter sockets are arranged between two distinct modules of the product, for example.

It should also be observed that the term "segment" is used herein for convenience to designate a portion of the pathway network 50 extending between two nodes 15.

During the positioning step 31, each equipment 61, 63, 64 is thus placed in a zone, either automatically or as selected by an operator acting on the fourth means 30.

More precisely, each equipment is located at the center of gravity of the zone 14 in question. Surprisingly, this simplified arrangement suffices in the end to obtain an evaluation that is satisfactory, compared with an evaluation based on the exact positioning of each equipment in the zone.

It should be observed that a single reference appears in each zone. Nevertheless, since each equipment is finally positioned at the same place within a zone, each reference may be associated with a plurality of pieces of equipment. For example, reference 61 may cover three distinct pieces of equipment placed in the first zone 141.

As shown in FIG. 1, during a routing step 32, the fourth means 30 perform electrical and electronic routing in order to position the wired connections of the architecture 100.

Figure 5:
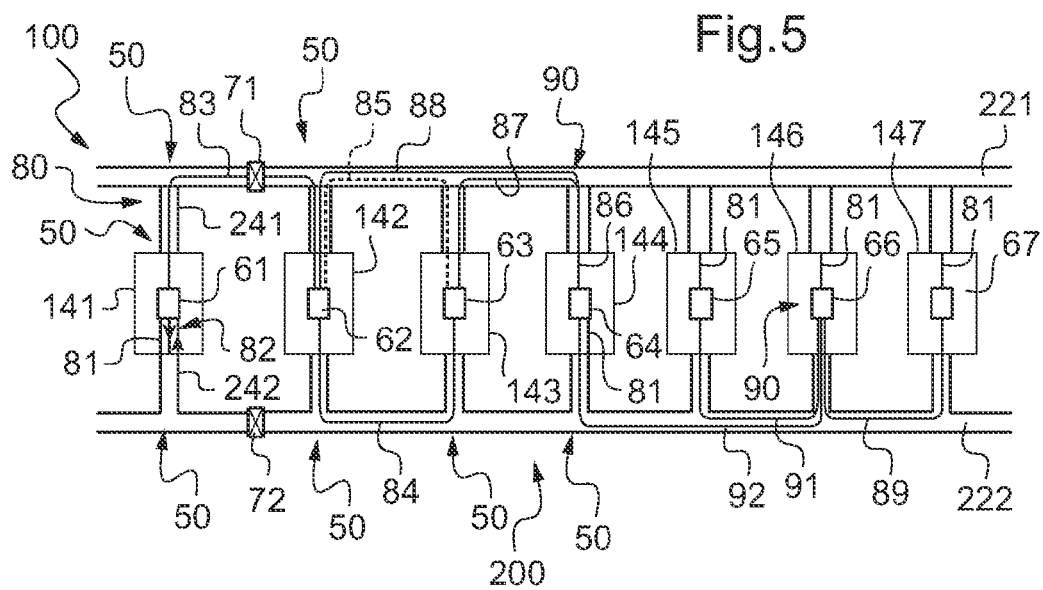
FIG. 5 is a diagram explaining the routing of the invention.

Under such circumstances, with reference to FIG. 5, the fourth means make use of the functional scheme drawn up during the fourth preparatory step for the purpose of connecting each equipment to the appropriate equipment and with the appropriate wired connections, i.e. the equipment and the wired connections 80 to 89, 91 to 92 corresponding to a given equipment.

The fourth means lay out the wired connections 80 to 89, 91 to 92 in the pathway network 15, e.g. giving precedence to the shortest distance.

For example, a first equipment of a first zone 141 is connected by a one-wire wired connection 83 passing via the first interrupter socket 71 to an equipment in the second zone 142.

If an equipment needs to be connected to another equipment in the same zone, then the wired connection between those two pieces passes via a node 50 of the zone.

For example, two pieces of equipment 61 in the first zone 141 are connected together via a wired connection 82 internal to the zone in question and passing via the node 50 connecting said first zone 141 to a secondary pathway 242. By way of example, this internal wired connection 82 consists of an electric wire going from a first equipment 61 of the first zone 141 via the nearest node 50 and then from said node 50 to a second equipment 61 in the first zone 141, the first and second pieces of equipment being positioned at the same location, by construction.

Furthermore, if a given equipment needs to be connected to a plurality of destination pieces of equipment, it is possible to define one wired connection per destination equipment.

However, in order to optimize the architecture 100, it is conceivable to make use of a common primary connection leaving the given equipment and going to an intermediate fork, followed by one secondary connection per destination equipment. Each secondary connection then starts from the intermediate fork prior to reaching a destination equipment.

In a variant, the destination fork may be represented by a node.

For example, an equipment 64 of the fourth zone 144 may need to be connected to an equipment 63 of the third zone 143 and to an equipment 62 of the second zone 142.

Under such circumstances, the wired connection constituting such a wired connection comprises a primary connection 86 leaving the equipment 64 in the fourth zone 144 and going to an intermediate fork 90 represented by a node 50 of the pathway network 15, and a first secondary connection 87 leaving said intermediate fork 90 to join the required equipment 63 in the third zone 143, and a second secondary connection 88 leaving said intermediate fork 90 to join the required equipment 62 in the second zone 142.

Furthermore, the list of equipment may include primary equipment relating to the operation of the equipment and secondary equipment relating to the operation of primary equipment. The function of the secondary equipment is to optimize the operation of the architecture 100 and of the primary equipment.

Consequently, the secondary equipment comprises at least one member selected from the following list of categories:
- a first category relating to electrical grounding means;
- a secondary category relating to distributing electrical power supplies;
- a third category relating to distributing lighting;
- a fourth category relating to interconnection means; and
- a fifth category relating to data concentration means.

The architecture 100 possesses wired connections for connecting the primary equipment to secondary equipment.

Under such circumstances, a wired connection connects a primary equipment to a secondary equipment.

For example, a secondary equipment 63 of the third zone 143 represents electrical ground, and a primary equipment 62 of the second zone 142 is connected to said secondary equipment 63 of the third zone 143 via a grounding wired connection 84.

The fourth means optionally simulate, for each primary equipment, all possible situations by studying one after another the potential wired connections and it validates the trace that is the least expensive in application of predefined criteria relating to length or to weight, for example. During a first iteration, the fourth means may select the secondary equipment that is closest to the primary equipment under consideration.

Similarly, if a destination fork is programmed for connecting a primary or secondary equipment to a plurality of primary and/or secondary equipment, instead of using a node for making an intermediate fork as in the above-described variant, it is advantageous to make use of a secondary equipment of the fourth category.

For example, an equipment 67 in the seventh zone 147 may need to be connected to an equipment 65 in the fifth zone 145 and to an equipment 64 in the fourth zone 144.

Under such circumstances, the wired connection making such a wired connection comprises a primary connection 89 leaving the equipment 67 in the seventh zone 147 so as to join an intermediate fork 90 represented by a secondary equipment 90 in the sixth zone 146, together with a first secondary connection 91 leaving the secondary equipment 90 in the sixth zone 146 to join the required equipment 65 in the fifth zone 145, and a second secondary connection 92 leaving the secondary equipment 90 in the sixth zone 146 in order to join the required equipment 64 in the fourth zone 144.

The fourth means may simulate all possible configurations by investigating one after another the traces that pass via each piece of the secondary equipment of the fourth category, and they validate the trace that is the least expensive in application of predefined criteria, e.g. relating to length and to weight.

Furthermore, it may be observed that the pathway network has a plurality of pathways, and each pathway may include an attribute putting a limit on routing.

Under such circumstances, the functional scheme may include, for at least one given wired connection, a routing constraint that corresponds to a routing limitation.

During the routing step, the fourth means 30 then force each wired connection having a routing constraint to follow pathways that have a routing limitation compatible with said routing constraint.

With reference to FIG. 1, at the end of the routing step 30, an architecture 100 is obtained.

At this stage, it is possible to extract the characteristics of the architecture, if necessary.

In addition, fifth means 40 may perform a step of evaluating the architecture, the fifth means 40 possibly being the same as the fourth means, for example, or including computation means for studying said architecture.

Such an evaluation may consist in determining at least one of the elements from the following selection:
- the weight value for the architecture;
- the center of gravity of the architecture;
- the number of wires passing via a segment connecting together two nodes 50, and the diameter of the associated strand made up of said wires;
- the number of wires connected to each interrupter socket 70;
- the number of wires connected to each secondary equipment.

In order to determine the weight value or the center of gravity, it is possible to determine the thickness of the wires in each wired connection, which thickness may be defined using a table specifying the thickness of a wired connection as a function of its length, for example.

The corresponding architecture and evaluation may be stored in memory.

Subsequently, it is possible to simulate an alternative architecture in application of a re-iteration step 44 by modifying either the pathway network 15, or the location of at least one equipment 60, or the pathway network 15 and the location of at least one equipment 60, in order to obtain an alternative architecture associated with a new evaluation.

Potential locations for a given equipment are provided by the list drawn up during the third preparatory step. In one implementation, an operator defines all potential pathway networks, and stores the configurations in said list or in a dedicated database.

Using an optionally-heuristic algorithm, the fifth means implement simulation and evaluation of all possible architectures.

It should be observed that if the number of wires connected to an electrical interrupter socket for a given architecture is less than a first threshold, then during construction of an alternative architecture, said interrupter socket is omitted.

For example, with reference to FIG. 5, the second interrupter socket is omitted.

Similarly, for a pathway network 15 including at least one secondary equipment 63, if the number of wires connected to said secondary equipment 63 in a given architecture is less than a second threshold, then the secondary equipment 63 is omitted when constructing an alternative architecture.

For example, it may be assumed that there is no need to conserve a secondary equipment 63 in the third zone 143.

Finally, for a pathway network 15 having a plurality of segments 200, if the number of wires passing along a segment 200 is less than a third threshold, then it is possible to omit such a segment 200 during construction of an alternative architecture.

During a step 42 of providing assistance in decision taking, the architectures that are obtained are compared and the architecture that comes closest to the requirements of the manufacturer is selected.

Finally, in a finishing step 43, the selected architecture is implemented, by placing the pieces of equipment locally in their zones and then by fabricating said architecture.

Naturally, the present invention may be subjected to numerous variations as to its implementation. Although several implementations are described above, it will readily be understood that it is not conceivable to identify exhaustively all possible variations. It is naturally possible to envisage replacing any of the means described by equivalent means without going beyond the ambit of the present invention.

What is claimed is:

1. A method of synthesizing an electrical and electronic architecture of a complete product that needs to satisfy given requirements, said architecture including wired connections connecting together some pieces of equipment of the product, the method comprising the following steps performed by at least one computer hardware unit:
defining zones of said product suitable for receiving said equipment;
defining a network of pathways within said product for receiving said wired connections, the pathway network connecting any one zone to all the other zones;
drawing up a list of pieces of equipment for installing in said product and the zones in which each equipment can be arranged;
drawing up at least one functional scheme comprising, for at least one equipment, information relating to the wired connections leaving the equipment and to their destinations;
positioning each equipment in a zone;
performing routing by connecting each piece of equipment in compliance with said information by means of wired connections following said pathway network; and
evaluating said architecture in order to determine whether it is compatible with said requirements, and storing the architecture and the evaluation in memory, wherein each piece of equipment is placed at the center of gravity of a zone.

2. The method according to claim 1, wherein after storing the architecture and the evaluation, either the pathway network, or the location of at least one equipment, or both the pathway networks and the location of at least one equipment is/are modified in order to obtain an alternative architecture associated with a new evaluation.

3. The method according to claim 1, wherein the product extends from a front end to a rear end and in order to define a pathway network, and the following steps are performed:
defining at least one primary pathway going from said front end to said rear end;
defining a plurality of secondary pathways, each zone being connected to each primary pathway via a respective secondary pathway, a node being located at each intersection between a primary pathway and a secondary pathway, and a node being located at each intersection between a secondary pathway and a zone.

4. The method according to claim 1, wherein said pathway network has a plurality of pathways and each pathway includes a routing limitation, with said functional scheme including for at least one given wired connection a routing constraint corresponding to a routing limitation of at least one pathway.

5. The method according to claim 1, wherein if two pieces of equipment in a given zone need to be connected together by a wired connection, the zone being connected to the pathway networks via at least one node, then during routing the wired connection connecting together two pieces of equipment in a given zone is caused to pass via a node of said given zone.

6. The method according to claim 1, wherein said list of equipment includes primary equipment and secondary equipment dedicated to enabling said primary equipment to operate properly, and said secondary pieces of equipment comprise at least one member selected from one of the following categories: electrical grounding means; electrical power supply distribution means; lighting distribution means; interconnection means; and data concentration means.

7. The method according to claim 6, wherein with said functional scheme indicating that a given primary equipment is to be electrically connected to a secondary equipment of a given category, during routing the primary equipment is connected via a wired connection to the secondary equipment of the given category that is the closest to the given primary equipment.

8. The method according to claim 1, wherein in order to perform said evaluation, at least one of the elements is determined in the following selection:
the weight value of the architecture;
the center of gravity of the architecture;
for the pathway network having at least one primary pathway, each zone being connected to each primary pathway via a respective secondary pathway, a node being located at each intersection between a primary pathway and a secondary pathway, and a node being located at each intersection between a secondary pathway and a zone, the number of wires passing along a segment interconnecting two nodes, and the diameter of an associated strand including said wires;
for said pathway network having at least one interrupter socket, the number of wires connected to said interrupter socket; and
for said list of equipment including primary equipment and secondary equipment dedicated to ensuring proper operation of said primary equipment, the number of wires connected to each secondary equipment.

9. The method according to claim 8, wherein in order to determine said weight value or said center of gravity, the thickness of the wires in each wired connection is determined.

10. The method according to claim 1, wherein for said pathway network having at least one interrupter socket, if the number of wires connected to said interrupter socket for a given architecture is less than a first threshold, then while constructing an alternative architecture said interrupter socket is omitted.

11. The method according to claim 1, wherein, for said list of equipment comprising primary equipment and secondary equipment dedicated to proper operation of said primary equipment, if the number of wires connected to a secondary equipment for a given architecture is less than a second threshold, then during construction of an alternative architecture said secondary equipment is omitted.

12. The method according to claim 1, wherein for said pathway network including a plurality of segments, if the number of wires passing along a segment is less than a third threshold, then during construction of an alternative architecture, said segment is omitted.

13. The method according to claim 1, wherein said product is a vehicle.

14. A method of synthesizing an electrical and electronic architecture of a complete product that needs to satisfy given requirements, said architecture including wired connections connecting together some pieces of equipment of the product, the method comprising the following steps performed by at least one computer hardware unit:
defining zones of said product suitable for receiving said equipment;
defining a network of pathways within said product for receiving said wired connections, the pathway network connecting any one zone to all the other zones;
drawing up a list of pieces of equipment for installing in said product and the zones in which each equipment can be arranged;

drawing up at least one functional scheme comprising, for at least one equipment, information relating to the wired connections leaving the equipment and to their destinations;

positioning each equipment in a zone;

performing routing by connecting each piece of equipment in compliance with said information by means of wired connections following said pathway network; and evaluating said architecture in order to determine whether it is compatible with said requirements, and storing the architecture and the evaluation in memory;

wherein said list of equipment includes primary equipment and secondary equipment dedicated to enabling said primary equipment to operate properly, and said secondary pieces of equipment comprise at least one member selected from one of the following categories: electrical grounding means; electrical power supply distribution means; lighting distribution means; interconnection means; and data concentration means; and wherein with said functional scheme indicating that a given primary equipment is to be electrically connected to a secondary equipment of a given category, during routing the primary equipment is connected via a wired connection to the secondary equipment of the given category that is the closest to the given primary equipment.

15. A method of synthesizing an electrical and electronic architecture of a complete product that needs to satisfy given requirements, said architecture including wired connections connecting together some pieces of equipment of the product, the method comprising the following steps performed by at least one computer hardware unit:

defining zones of said product suitable for receiving said equipment;

defining a network of pathways within said product for receiving said wired connections, the pathway network connecting any one zone to all the other zones;

drawing up a list of pieces of equipment for installing in said product and the zones in which each equipment can be arranged;

drawing up at least one functional scheme comprising, for at least one equipment, information relating to the wired connections leaving the equipment and to their destinations;

positioning each equipment in a zone;

performing routing by connecting each piece of equipment in compliance with said information by means of wired connections following said pathway network; and evaluating said architecture in order to determine whether it is compatible with said requirements, and storing the architecture and the evaluation in memory;

wherein in order to perform said evaluation, at least one of the elements is determined in the following selection:

the weight value of the architecture;

the center of gravity of the architecture;

for the pathway network having at least one primary pathway, each zone being connected to each primary pathway via a respective secondary pathway, a node being located at each intersection between a primary pathway and a secondary pathway, and a node being located at each intersection between a secondary pathway and a zone, the number of wires passing along a segment interconnecting two nodes, and the diameter of an associated strand including said wires;

for said pathway network having at least one interrupter socket, the number of wires connected to said interrupter socket; and for said list of equipment including primary equipment and secondary equipment dedicated to ensuring proper operation of said primary equipment, the number of wires connected to each secondary equipment; and wherein in order to determine said weight value or said center of gravity, the thickness of the wires in each wired connection is determined.

16. A method of synthesizing an electrical and electronic architecture of a complete product that needs to satisfy given requirements, said architecture including wired connections connecting together some pieces of equipment of the product, the method comprising the following steps performed by at least one computer hardware unit:

defining zones of said product suitable for receiving said equipment;

defining a network of pathways within said product for receiving said wired connections, the pathway network connecting any one zone to all the other zones;

drawing up a list of pieces of equipment for installing in said product and the zones in which each equipment can be arranged;

drawing up at least one functional scheme comprising, for at least one equipment, information relating to the wired connections leaving the equipment and to their destinations;

positioning each equipment in a zone;

performing routing by connecting each piece of equipment in compliance with said information by means of wired connections following said pathway network; and evaluating said architecture in order to determine whether it is compatible with said requirements, and storing the architecture and the evaluation in memory;

wherein for said pathway network having at least one interrupter socket, if the number of wires connected to said interrupter socket for a given architecture is less than a first threshold, then while constructing an alternative architecture said interrupter socket is omitted.

17. A method of synthesizing an electrical and electronic architecture of a complete product that needs to satisfy given requirements, said architecture including wired connections connecting together some pieces of equipment of the product, the method comprising the following steps performed by at least one computer hardware unit:

defining zones of said product suitable for receiving said equipment;

defining a network of pathways within said product for receiving said wired connections, the pathway network connecting any one zone to all the other zones;

drawing up a list of pieces of equipment for installing in said product and the zones in which each equipment can be arranged;

drawing up at least one functional scheme comprising, for at least one equipment, information relating to the wired connections leaving the equipment and to their destinations;

positioning each equipment in a zone;

performing routing by connecting each piece of equipment in compliance with said information by means of wired connections following said pathway network; and evaluating said architecture in order to determine whether it is compatible with said requirements, and storing the architecture and the evaluation in memory;

wherein, for said list of equipment comprising primary equipment and secondary equipment dedicated to proper operation of said primary equipment, if the number of wires connected to a secondary equipment for a given architecture is less than a second threshold, then during construction of an alternative architecture said secondary equipment is omitted.

18. A method of synthesizing an electrical and electronic architecture of a complete product that needs to satisfy given requirements, said architecture including wired connections connecting together some pieces of equipment of the product, the method comprising the following steps performed by at least one computer hardware unit:

defining zones of said product suitable for receiving said equipment;

defining a network of pathways within said product for receiving said wired connections, the pathway network connecting any one zone to all the other zones;

drawing up a list of pieces of equipment for installing in said product and the zones in which each equipment can be arranged;

drawing up at least one functional scheme comprising, for at least one equipment, information relating to the wired connections leaving the equipment and to their destinations;

positioning each equipment in a zone;

performing routing by connecting each piece of equipment in compliance with said information by means of wired connections following said pathway network; and evaluating said architecture in order to determine whether it is compatible with said requirements, and storing the architecture and the evaluation in memory;

wherein for said pathway network including a plurality of segments, if the number of wires passing along a segment is less than a third threshold, then during construction of an alternative architecture, said segment is omitted.

* * * * *